(12) United States Patent
Maehiro et al.

(10) Patent No.: US 7,677,977 B2
(45) Date of Patent: Mar. 16, 2010

(54) VIDEO GAME PROCESSING APPARATUS, A METHOD AND A COMPUTER PROGRAM PRODUCT FOR PROCESSING A VIDEO GAME

(75) Inventors: Kazutoyo Maehiro, Tokyo (JP); Takashi Isowaki, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 164 days.

(21) Appl. No.: 11/680,205

(22) Filed: Feb. 28, 2007

(65) Prior Publication Data

US 2007/0218992 A1 Sep. 20, 2007

(30) Foreign Application Priority Data

Mar. 15, 2006 (JP) ............................. 2006-070105

(51) Int. Cl.
*A63F 13/00* (2006.01)
(52) U.S. Cl. ...................... 463/32; 273/317.1; 345/473; 345/474; 715/706; 715/757
(58) Field of Classification Search .................. 463/1–5, 463/7–8, 23, 30–34, 36–39, 40–43, 49–57, 463/9; 345/156, 419, 1.1–3.4, 473–475, 345/618–619, 629; 273/148 R, 148 B, 309, 273/317.1, 340, 348, 361–367; 717/168–178; 348/37, 240; 434/115, 117, 211.14; 715/706, 715/738, 757, 762–764
See application file for complete search history.

(56) References Cited

U.S. PATENT DOCUMENTS 5,411,270 A * 5/1995 Naka et al. ..................... 463/33

5,893,081 A 4/1999 Poppen (Continued)

FOREIGN PATENT DOCUMENTS

CA 2560722 10/2005

(Continued)

OTHER PUBLICATIONS

Devil May Cry, Oct. 17, 2001, Capcom Entertainment, Inc., see full document, see full.*

(Continued)

*Primary Examiner*—Peter DungBa Vo
*Assistant Examiner*—Arthur O. Hall
(74) *Attorney, Agent, or Firm*—Greenblum & Bernstein, P.L.C.

(57) ABSTRACT

A movement determining map is stored in addition to a field display map. The field display map is a three-dimensional map for displaying a field of the video game on the image display screen. The movement determining map is a two-dimensional map in which an enterable region. An unenterable region is distinguishably provided for the characters existing in the field. A control section determines a movement route of the sub character, in which no unenterable region exists, using the movement determining map when a predetermined movement route determining condition is met. The sub character is caused to move in accordance with the determined movement route. The predetermined movement route determining condition is met every predetermined period of time or in the case where the main character moves apart from the sub character in a predetermined distance or more.

18 Claims, 8 Drawing Sheets

U.S. PATENT DOCUMENTS

| | | | |
|---|---|---|---|
| 6,038,509 A * | 3/2000 | Poppen et al. | 701/210 |
| 6,162,120 A * | 12/2000 | Takahashi et al. | 463/8 |
| 6,213,873 B1 * | 4/2001 | Gasper et al. | 463/14 |
| 6,267,674 B1 * | 7/2001 | Kondo et al. | 463/32 |
| 6,267,676 B1 * | 7/2001 | Nagaoka | 463/43 |
| 6,585,599 B1 * | 7/2003 | Horigami et al. | 463/43 |
| 6,692,357 B2 * | 2/2004 | Koizumi et al. | 463/32 |
| 6,712,703 B2 * | 3/2004 | Miyamoto et al. | 463/43 |
| 6,755,743 B1 * | 6/2004 | Yamashita et al. | 463/42 |
| 6,821,204 B2 * | 11/2004 | Aonuma et al. | 463/32 |
| 6,878,065 B2 * | 4/2005 | Yamamoto et al. | 463/31 |
| 6,923,717 B2 * | 8/2005 | Mayer et al. | 463/4 |
| 7,170,508 B2 * | 1/2007 | Ohno et al. | 345/419 |
| 7,322,889 B2 * | 1/2008 | Ueshima | 463/34 |
| 7,374,480 B2 * | 5/2008 | Otani et al. | 463/8 |
| 2001/0026284 A1 * | 10/2001 | Yamamoto et al. | 345/619 |
| 2003/0058238 A1 * | 3/2003 | Doak et al. | 345/419 |
| 2003/0190960 A1 * | 10/2003 | Jokipii et al. | 463/42 |
| 2004/0229689 A1 * | 11/2004 | Nishimura | 463/30 |
| 2004/0267441 A1 | 12/2004 | Kim | |
| 2005/0195184 A1 * | 9/2005 | Yoshiike | 345/419 |
| 2005/0221880 A1 * | 10/2005 | Kando | 463/9 |
| 2006/0094502 A1 * | 5/2006 | Katayama et al. | 463/31 |
| 2006/0246974 A1 * | 11/2006 | Tsuda et al. | 463/7 |

FOREIGN PATENT DOCUMENTS

| | | |
|---|---|---|
| EP | 1493992 | 1/2005 |
| JP | 11-175747 | 7/1999 |
| WO | 98/24034 | 6/1998 |
| WO | 2005/095894 | 10/2005 |

OTHER PUBLICATIONS

Final Fantasy X-2, Nov. 18, 2003, Square Enix U.S.A., Inc., see full document, see full.*

Street Fighter Alpha 2, Oct. 1, 1996, Capcom Entertainment, Inc. ,see full.*

English Language Abstract and an English Language Partial Translation of JP 11-175747.

U.S. Appl. No. 11/674,297 to Itou et al., filed Feb. 12, 2007.

"Grow Lanser IV: Wayfarer of the time", Dengeki PlayStation, vol. 10, No. 3, pp. 72-77, Jan. 16, 2004, MediaWorks, accompanied by partial English-language translation.

"Super Basic! Game Algorithm, The $5^{th}$ : Character' aisle movement algorithm in virtual screen," Mycom Basic Magazine, vol. 18, No. 6, pp. 64-67, Jun. 1, 1999, Denpashinbunsha, accompanied by partial English-language translation.

"Thinking Routine: Implement thinking with programming, Thinking Routine of Battle and Movement," C Magazine, vol. 11, No. 1, p. 55-60, Jan. 1, 1999, Softbank Corp, accompanied by partial English-language translation.

"3D Algorithm of Movement," C Magazine, vol. 12, No. 9, pp. 30-35, Sep. 1, 2000, Softbank Publishing, accompanied by partial English-language translation.

Van Waveren, "The Quake III Arena Bot," University of Technology Delft, XP002433838, Jun. 28, 2001 [online], URL:http://www.kbs.twi.tudelft.nl/docs/MSc/2001/Waveren_Jean-Paul_van/thesis.pdf [retrieved on May 13, 2007].

Fredriksen, "Middleware Solutions for Artificial Intelligence in Computer Games," Norwegian University of Science and Technology, XP002433839, Nov. 27, 2003 [online], URL:http://www.idi.ntnu.no/grupper/su/fordypningsprosjekt-2003/fordypning2003-Jan-Harald-Fredriksen.pdf [retrieved on May 14, 2007].

* cited by examiner

FIELD

MOVEMENT DETERMINING MAP

FIG. 5

| POLYGON NAME | ATTRIBUDE | ENTERABLE/ UNENTERBLE | POLYGON DISPLAY REGION |
|---|---|---|---|
| P00001 | FLOOR | AVAILABLE | ((a1,b1), (c1,d1), (e1,f1)) |
| P00002 | FLOOR | AVAILABLE | ((a2,b2), (c2,d2), (e2,f2)) |
| P00003 | FLOOR | AVAILABLE | ((a3,b3), (c3,d3), (e3,f3)) |
| P00004 | FLOOR | UNAVAILABLE | ((a4,b4), (c4,d4), (e4,f4)) |
| P00005 | WALL | UNAVAILABLE | ((a5,b5), (c5,d5), (e5,f5)) |
| P00006 | WALL | UNAVAILABLE | ((a6,b6), (c6,d6), (e6,f6)) |
| ⋮ | ⋮ | ⋮ | ⋮ |

FIG. 6

| OBSTACLE NAME | ATTRIBUDE | ENTERABLE/ UNENTERBLE | OBSTACLE DISPLAY REGION |
|---|---|---|---|
| P00001 | TREE | UNAVAILABLE | CENTER (x1, y1), RADIUM (z1) |
| P00002 | TREE | UNAVAILABLE | CENTER (x2, y2), RADIUM (z2) |
| P00003 | TREE | UNAVAILABLE | CENTER (x3, y3), RADIUM (z3) |
| P00004 | TREE | UNAVAILABLE | CENTER (x4, y4), RADIUM (z4) |
| P00005 | STONE | UNAVAILABLE | CENTER (x5, y5), RADIUM (z5) |
| P00006 | WALL | UNAVAILABLE | ((p1,p2), (q1,q2), (r1,r2), (s1,s2)) |
| ⋮ | ⋮ | ⋮ | ⋮ |

MOVEMENT DETERMINING MAP

MOVEMENT DETERMINING MAP

MOVEMENT DETERMINING MAP

MOVEMENT DETERMINING MAP

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-070105, filed on Mar. 15, 2006, the disclosure of which is expressly incorporated herein by reference in its entirety.

BACKGROUND OF THE INVENTION

1. Field of the Invention

The present invention relates to a technique for controlling progress of a video game by displaying a main character and a sub character on an image display screen of an image display apparatus, and by controlling an action of the main character and the sub character displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a video game such as a RPG, generally, the video game proceeds by moving the player character and the like in accordance with operations of a player. Further, in the video game, one friend character or two or more friend characters (hereinafter, referred to as "sub player character" or "sub character") that acts together with the player character may enter a field.

The sub character is not operated to move directly from the player, but moves to follow a main character (the player character). For this reason, for example, in the case where the main character changes a moving direction when going straight ahead, the sub character also changes a moving direction so as to follow the change of the moving direction. However, in the case where there is an obstacle of the like on a movement route of the sub character, the sub character cannot move due to the obstacle.

Heretofore, there is proposed a video game apparatus that determines whether or not a sub character collides with a sub character using a circumscribed quadrangular shape with respect to an object (for example, see Japanese Patent Application Publication No. 11-175747).

However, the circumscribed quadrangular shape with respect to an object is used in the technique disclosed in the Japanese Patent Application Publication described above. Thus, there was a problem that a processing load for determining whether or not the sub character collides with the obstacle becomes heavy. In the field of technology of processing a video game, there is desire to achieve collision detection or collision determination between an obstacle and a sub character without a heavy processing load.

SUMMARY OF THE INVENTION

It is one object of the present invention to solve the problems described above and to provide a video game processing apparatus, a method and a computer program product for processing a video game by which in a video game such as a RPG it is possible to prevent a sub character following a main character from becoming a movement impossible state due to an obstacle by means of simple processing in which a processing load is reduced.

In order to achieve the above object, an aspect of the present invention is directed to a video game processing apparatus. The video game processing apparatus causes an image display apparatus to display multiple characters, including a main character and a sub character, on an image display screen of the image display apparatus. The video game processing apparatus controls progress of the video game by controlling an action of the main character to be displayed on the image display screen in accordance with operations by a player and an action of the sub character moving so as to follow the main character to be displayed on the image display screen in accordance with a predetermined control program. The video game processing apparatus of the present invention includes a movement determining map memory that stores a movement determining map in addition to a field display map, the field display map being a three-dimensional map for displaying a field of the video game on the image display screen, the movement determining map being a two-dimensional map in which an enterable region and an unenterable region being distinguishably provided for the characters existing in the field.

The video game processing apparatus also includes a movement route determiner that determines a movement route of the sub character using the movement determining map when a predetermined movement route determining condition is met, no unenterable region existing on the movement route of the sub character.

The video game processing apparatus also includes a movement executor that causes the sub character to move in accordance with the movement route determined by the movement route determiner.

Since the video game processing apparatus may have a configuration as described above, it is possible to prevent the sub character following the main character from becoming a movement impossible state due to an obstacle or the like by means of a simple process in which a processing load is reduced.

It is preferable that the predetermined movement route determining condition is met every predetermined period of time. Alternatively, it is preferable that the predetermined movement route determining condition is met in the case where the main character moves apart from the sub character in a predetermined distance or more.

It is preferable that the movement determining map includes a floor part having an enterable region in at least a part thereof and a wall part that is an unenterable region.

It is preferable that the floor part further has an unenterable region.

It is preferable that an obstacle is provided and displayed in the field, and in the movement determining map, a predetermined circumferential region of the obstacle including a display region in which the obstacle is displayed is set to an obstacle part that is an unenterable region.

It is preferable that the movement route determiner includes: a destination determiner that determines a movement destination to which the sub character moves; and a movement route decider that decides the shortest movable route on which the sub character can move at the shortest distance among movement routes on which the sub character can move from a current position thereof to the movement destination determined by the destination determiner without entering an unenterable region. Since the video game processing apparatus may have a configuration as described above, it is possible to determine the movement route of the sub character on which the sub character can move at the shortest distance without entering any unenterable region by means of a simple process using the movement determining map.

It is preferable that the movement route decider includes: a shortest movement route determiner that determines the shortest movement route on which the sub character moves from the current position to the movement destination determined by the destination determiner at the shortest distance; an unenterable region determiner that determines whether or not an unenterable region is included on the shortest movement route determined by the shortest movement route determiner; an unenterable region memory that stores the unenterable region determined to be included on the shortest movement route by the unenterable region determiner; and an unenterable region bypass route determiner that determines an unenterable region bypass route on which the sub character moves from the current position to the movement destination determined by the destination determiner at the shortest distance in the case where the unenterable region is stored in the unenterable region memory, the unenterable region bypass route being determined within a region from which the unenterable region stored in the unenterable region memory is eliminated. In this case, the unenterable region determiner also determines whether or not a new unenterable region is included on the unenterable region bypass route determined by the unenterable region bypass route determiner. Further, the movement route decider decides the shortest movement route or the unenterable region bypass route, in which the unenterable region determiner or the unenterable region bypass route determiner determines that no unenterable region is included, as the shortest movable route that is the movement route of the sub character. Since the video game processing apparatus may have a configuration as described above, it is possible to determine the movement route of the sub character on which the sub character can move at the shortest distance without entering any unenterable region by means of a simple process using the movement determining map.

Further, according to another aspect of the present invention, the present invention is directed to a method of processing a video game by causing an image display apparatus to display a player character of the video game on an image screen of the image display apparatus. In this case, the method controls progress of the video game by controlling an action of the player character to be displayed on the image screen in accordance with an operation by a player and an action of the sub character to be displayed on the image display screen in accordance with a predetermined control program. The method of the present invention includes determining a movement route of the sub character using a movement determining map other than a field display map when a predetermined movement route determining condition is met, no unenterable region existing on the movement route of the sub character, the field display map being a three-dimensional map for displaying a field of the video game on the image display screen, the movement determining map being a two-dimensional map in which an enterable region and an unenterable region being distinguishably provided for the characters existing in the field.

The method also includes causing the sub character to move in accordance with the determined movement route.

Moreover, according to still another aspect of the present invention, the present invention is directed to a computer program product for processing a video game. In this case, progress of the video game is controlled by causing an image display apparatus to display a player character of the video game on an image screen of the image display apparatus, and controlling an action of the player character to be displayed on the image screen in accordance with operations by a player and an action of the sub character to be displayed on the image display screen. The computer program product of the present invention causes a computer to execute steps including determining a movement route of the sub character using a movement determining map other than a field display map when a predetermined movement route determining condition is met, no unenterable region existing on the movement route of the sub character, the field display map being a three-dimensional map for displaying a field of the video game on the image display screen, the movement determining map being a two-dimensional map in which an enterable region and an unenterable region being distinguishably provided for the characters existing in the field.

The steps also include causing the sub character to move in accordance with the determined movement route.

According to the present invention, in a video game such as a RPG, it is possible to prevent a sub character following a main character from becoming a movement impossible state due to an obstacle by means of simple processing in which a processing load is reduced.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 5 is an explanatory drawing that shows an example of a polygon attribute table indicating an attribute and the like of each of polygons constituting the movement determining map.

FIG. 6 is an explanatory drawing that shows an example of an obstacle attribute table indicating an attribute and the like of each of obstacles constituting the movement determining map.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
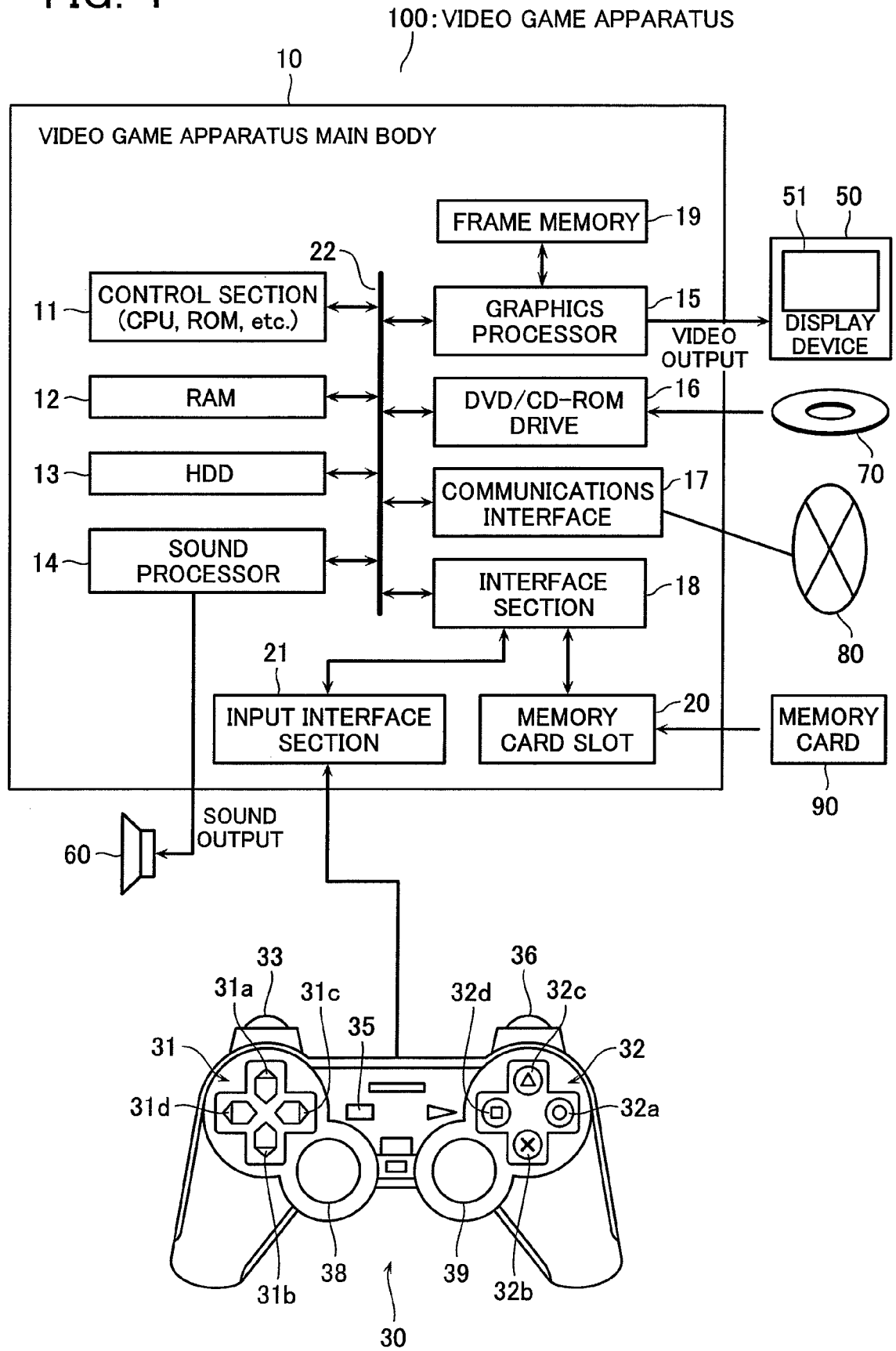
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X key 32b, a triangle key 32c and a square key 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a main character and the like) are stored in the RAM 12 used as a work memory while the control section 11 executes processing.

It is assumed that a three-dimensional video game according to an aspect of the present embodiment is a video game wherein multiple characters, including a main character (that is, a character that moves in accordance with the operation of the keypad 30 by the player, also referred to as a "player character"), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character (that is, main character) and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
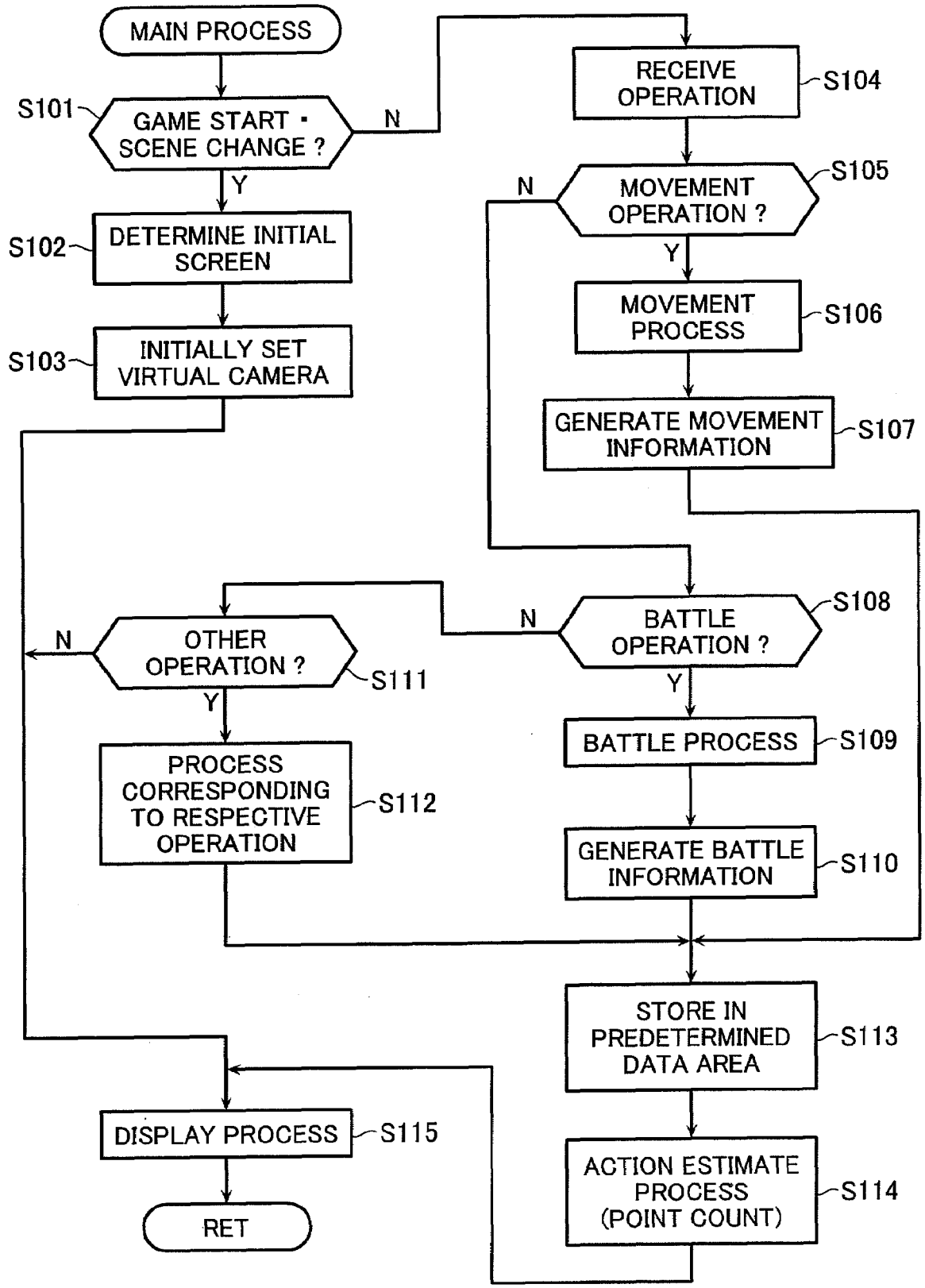
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every $\frac{1}{30}$ second. However, it is to be noted that timing of "at every $\frac{1}{30}$ second" is only one example, as mentioned above. Instead, for example, the main process may be executed in accordance with a timer interruption at every single field period (every $\frac{1}{60}$ second) or at every two frame periods (every $\frac{1}{15}$ second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters, are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control section 11 receives instruction data for instructing an action of the player character relating to the movement of the player character (that is, movement instruction data: a movement instruction by a movement command or the cross key (directional instruction key)) in accordance with the operation of the keypad 30 relating to the movement of the player character (movement operation) at Step S104 ("Yes" at Step S105), the control section 11 executes a movement process in accordance with the movement instruction data thus received (Step S106). In the movement process, the control section 11 causes the position of the player character to be moved in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character after the movement, the viewpoint position of the virtual camera, the direction of the visual axis, and the size of the visual angle changed along with the movement of the player character as well as the information on the movement of the player character. Then, the processing flow proceeds to Step S113.

In the case where the control section 11 receives instruction data for instructing an action for the player character relating to a battle (that is, battle instruction data: a battle command) in accordance with the operation of the keypad 30 by the player for instructing the action of the player character relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character that battles an enemy character in the battle process, the name of the enemy character, battle development information, battle result information, a parameter (or parameters) that defines the ability (or abilities) of the player character, and the like. The battle information includes various kinds of information on the battle, such as the name of the player character that battles the enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data: an other command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of the information indicating the action histories of the player character once stored in the RAM 12 (Step S114). More specifically, information required to be digitized is digitized using conversion tables prepared in advance. Further, with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character and the non-player characters to be displayed from the virtual camera onto the virtual screen in accordance with the setting contents of the virtual camera and the like. The control section 11 then executes a display process to generate a two-dimensional image to be displayed on the image display screen 51 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character and the three-dimensional non-player characters are included, from the coordinates of the world coordinate system to the coordinates of the viewpoint coordinate system. Subsequently, the control section 11 transmits the coordinates of the vertexes of the polygons of the player character and the non-player characters in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character and/or the non-player characters are moved on the field and perceive the images as moving images.

Figure 3:
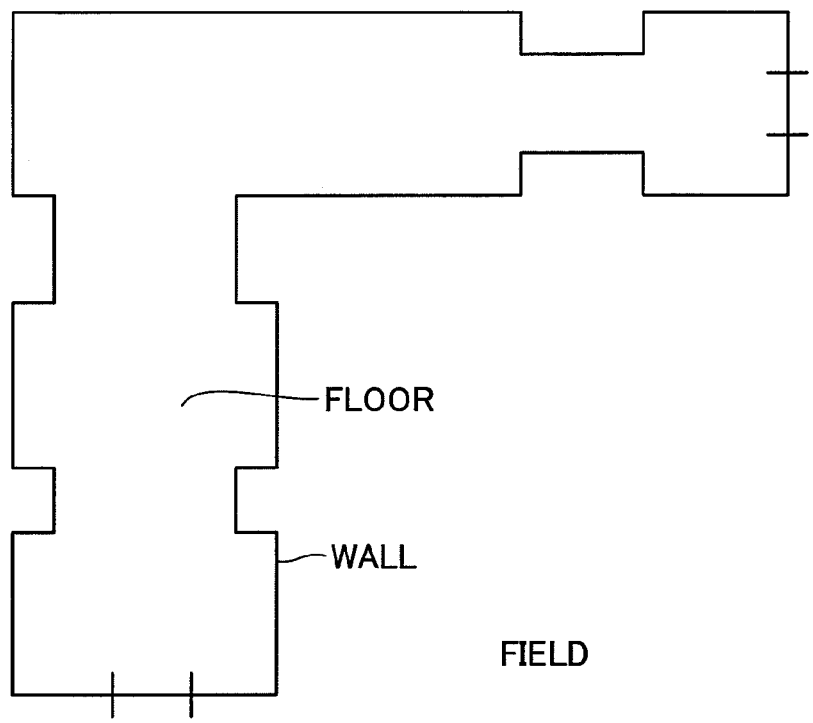
FIG. 3 is an explanatory drawing that shows an example of a simplified field when viewed from above.
Figure 4:
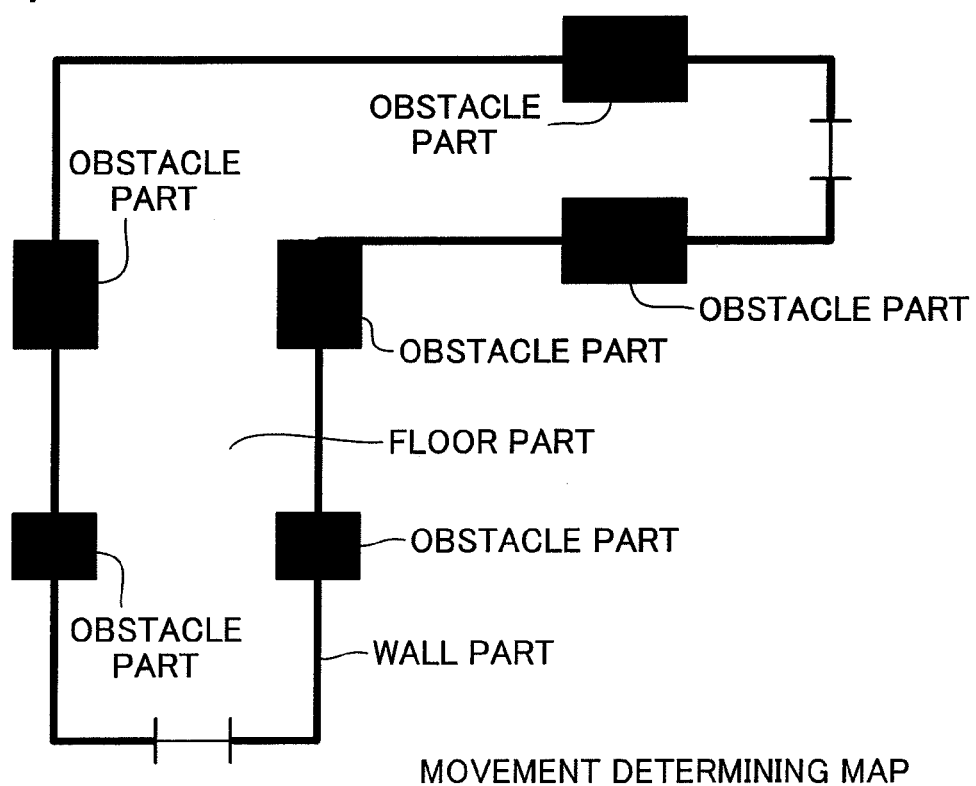
FIG. 4 is an explanatory drawing that shows an example of a movement determining map.

FIG. 3 is an explanatory drawing that shows an example of a field used in the video game of the present embodiment. FIG. 4 is an explanatory drawing that shows an example of a movement determining map corresponding to the field shown in FIG. 3. In the present embodiment, a field map for displaying various fields such as the filed shown in FIG. 3 and a movement determining map for displaying various fields such as the movement determining map shorn in FIG. 4 are prepared in advance and stored in the storage medium 70. Such maps are read out from the storage medium 70 by the installed DVD/CD-ROM drive 16, and loaded on the RAM 12 to be used.

The field shown in FIG. 3 is a plan view of the field simplified to simplify the explanation when viewed from above the field. A field map in an actual video game is prepared by means of a three-dimensional map for displaying a virtual space realistically. In the video game, the field illustrated as the virtual three-dimensional space is displayed by means of three-dimensional polygons on the basis of the three-dimensional field map.

The movement determining map is prepared as a two-dimensional map. As shown in FIG. 4, for example, the movement determining map is used to determine whether a route on which a character moves is an enterable region or not. The movement determining map is constituted from the two-dimensional map in which multiple polygons are combined. Attributes and the like are respectively applied to the polygons and obstacles, which constitute the two-dimensional map.

FIG. 5 is an explanatory drawing that shows an example of a polygon attribute table indicating an attribute and the like of each of the polygons, which constitute the movement determining map. FIG. 6 is an explanatory drawing that shows an example of an obstacle attribute table indicating an attribute and the like of each of the obstacles, which also constitute the movement determining map.

As shown in FIG. 5, items of each of the polygons that constitute a predetermined movement determining map are set in the polygon attribute table. The items include: a polygon name by which a polygon can be distinguished; a polygon attribute that indicates a display object displayed in the corresponding field; enterable or unenterable (non-enterable) information that indicates whether a character can enter the polygon or not; coordinate data for identifying a display region of the polygon; and the like. In the present embodiment, any one of a floor, a wall and the like is set in the polygon attribute. Further, in the present embodiment, each polygon is constructed by a triangular shape. The coordinate data are constituted from three points of two-dimensional coordinates. In this regard, the shape of the polygon may be other shape.

In the present embodiment, as shown in FIG. 5, a region in which the polygon attribute is a "floor" is divided into two types of regions including a region that can be entered by any character (that is, an enterable region) and a region that cannot be entered by any character (that is, an unenterable region or non-enterable region). For example, the region whose attribute is the "floor" but in which there is afraid that a character cannot enter and move, such as a corner, may be set to an "unenterable region". Further, the region whose attribute is a "wall" is consistently set to an "unenterable region".

As shown in FIG. 6, items of each of the obstacles that constitute a predetermined movement determining map are set in the obstacle attribute table. The items include: an obstacle name by which an obstacle can be distinguished; an obstacle attribute that indicates a display object displayed in the corresponding field; unenterable information that indicates that a character cannot enter a display region of the obstacle; coordinate data for identifying the display region of the obstacle; and the like. In the present embodiment, any one of a tree, a stone, a wall and the like is set in the obstacle attribute. Further, in the present embodiment, the coordinate data are constituted from two-dimensional circular coordinates including a center position and a radius. Namely, a circular region including a display region of an obstacle is identified by means of the two-dimensional circular coordinate. In this regard, the region including the display region of an obstacle is not limited to a circular region. The region including the display region of an obstacle may be identified by means of other region such as an elliptical region or a polygon region.

Figure 7:
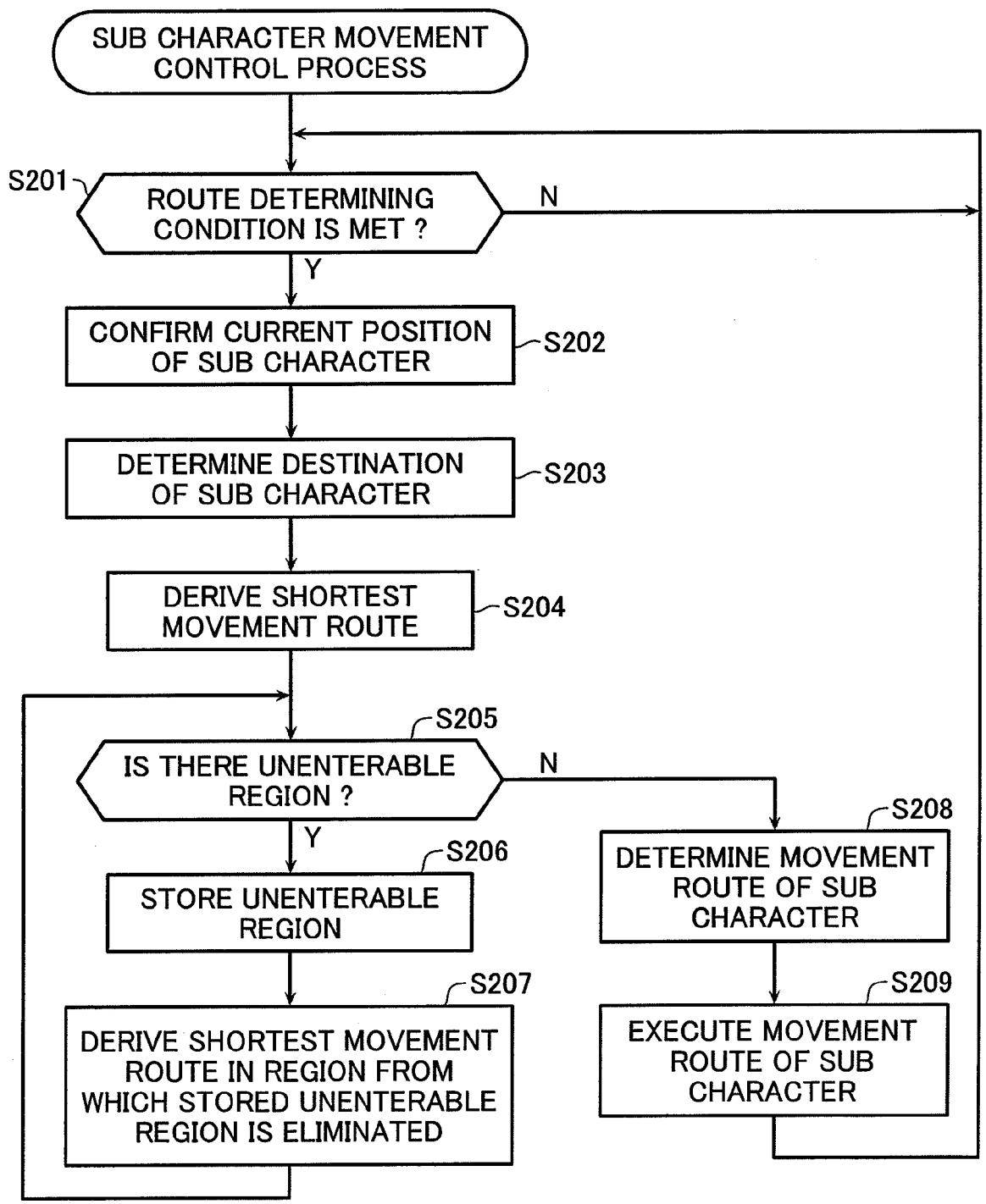
FIG. 7 is a flowchart that shows an example of a sub character movement control process.

Next, a sub character movement control process of the video game apparatus 100 according to the present embodiment will now be described. FIG. 7 is a flowchart that shows an example of a sub character movement control process. The sub character movement control process is a process in which processes relating to movement control of a sub character that follows a main character are put into one flowchart. This sub character movement control process is executed by executing the main process described above repeatedly.

Here, the case where two sub characters P2, P3 are moved so as to follow movement of a main character P1 will be described. In this case, although all of the main character P1 and the two sub characters P2, P3 are player characters, only the main character P1 executes an action such as movement in accordance with operations of the keypad 30 by the player.

In the sub character movement control process, the control section 11 first determines whether a predetermined route determining condition is met or not (Step S201). Here, the predetermined route determining condition is met whenever a predetermined period of time elapses. More specifically, the predetermined route determining condition is met whenever a timer interruption every ¹⁄₃₀ second is generated. In this regard, the route determining condition may be met when the main character P1 moves, an enemy character against which the main character P1 battles moves, or the like, for example.

When the route determining condition is met, the control section 11 confirms a current position of each of the sub characters P2, P3 (Step S202). The control section 11 then determines a destination of each of the sub characters P2, P3 (Step S203). The destination may be set to a standard position of each of the sub characters P2, P3, which is defined within a predetermined range based on a position of the main character P1 (for example, within a region having an elliptical shape centered around a position backward from the position of the main character P1 by a predetermined distance) in advance, for example. Further, for example, in a battle scene, the destination may be set to a standard position of each of the sub characters P2, P3, which is defined within a predetermined range based on the position of an enemy character that is a battle target in advance.

Subsequently, the control section 11 derives the shortest movement route from the current position confirmed at Step S202 to the destination determined at Step S203 (Step S204). Namely, the control section 11 derives, with respect to each of the sub characters P2, P3, the shortest movement route in which a route from the current position confirmed at Step S202 to the destination determined at Step S204 is connected to each other by means of a straight line. In this regard, the route derived herein is a route for which a width of each of the corresponding sub characters P2, P3 is considered so that each of the sub characters P2, P3 can pass through the route.

Next, the control section 11 refers to the polygon attribute table and the obstacle attribute table in the movement determining map that corresponds to a current field, thereby confirming whether or not there is an unenterable region in the derived shortest movement route (an unenterable region is included in the derived shortest movement route) (Step S205). Namely, the control section 11 confirms whether or not a polygon having an unenterable attribute is included in polygons of the derived shortest movement route, and whether or not a display region of any obstacle is included in the derived shortest movement route.

In the case where it is confirmed that an unenterable region is included in the derived shortest movement route, the control section 11 stores the polygon or polygons whose attribute is "unenterable" and the display region of the obstacle in the RAM 12 as an unenterable region (Step S206). In this regard, in the case where the destination is included in the stored unenterable region, the control section 11 changes the destination to the nearest position within a region having a predetermined range based on the position of the main character P1, from which the stored unenterable region is eliminated. The nearest position is set to a position with a clearance of a predetermined distance in consideration of the width of each of the sub characters P2, P3.

When the unenterable region is stored, the control section 11 derives the shortest movement route from the current position to the destination in the region from which the stored unenterable region is eliminated (Step S207). Namely, the control section 11 derives a new movement route for each of the sub characters P2, P3 as the shortest movement route in the region from which the stored unenterable region is eliminated. The new movement route is constituted so that the current position confirmed at Step S202 and the destination determined at Step S203 or the destination changed after Step S206 are connected to each other by means of a straight line or a curved line. In this regard, the derived route is also set to a route in consideration of the width of each of the sub characters P2, P3 so that each of the corresponding sub characters P2, P3 can pass through the derived route. Then, the processing flow returns to Step S205.

The control section 11 repeatedly executes the processes at Steps S205 to S207 described above until "No" is determined at Step S205 with respect to both of the movement routes of the respective sub characters P2, P3. In this way, the shortest movement routes in which each of the sub characters P2, P3 does not go through any unenterable region can be determined.

As described above, the control section 11 then refers to the polygon attribute table and the obstacle attribute table in the movement determining map that corresponds to a current field, thereby confirming whether or not there is an unenterable region in the derived shortest movement route (an unenterable region is included in the derived shortest movement route) (Step S205). Namely, the control section 11 confirms whether or not a polygon having an unenterable attribute is included in polygons of the derived shortest movement route, and whether or not a display region of any obstacle is included in the derived shortest movement route.

In the case where it is confirmed at Step S205 that an unenterable region is not included in the derived shortest movement route, the control section 11 determines that the derived shortest movement route of each of the sub characters P2, P3 is set to a movement route of each of the sub characters P2, P3 (Step S208). The control section 11 then executes a movement control process in which each of the sub characters P2, P3 is caused to move in accordance with the determined movement route of each of the sub characters P2, P3 (Step S209). Then, the processing flow returns to Step S201.

Although the movement control process for the two sub characters P2, P3 has been explained in the embodiment described above, the number of sub characters may be one, or three or more.

Figure 8:
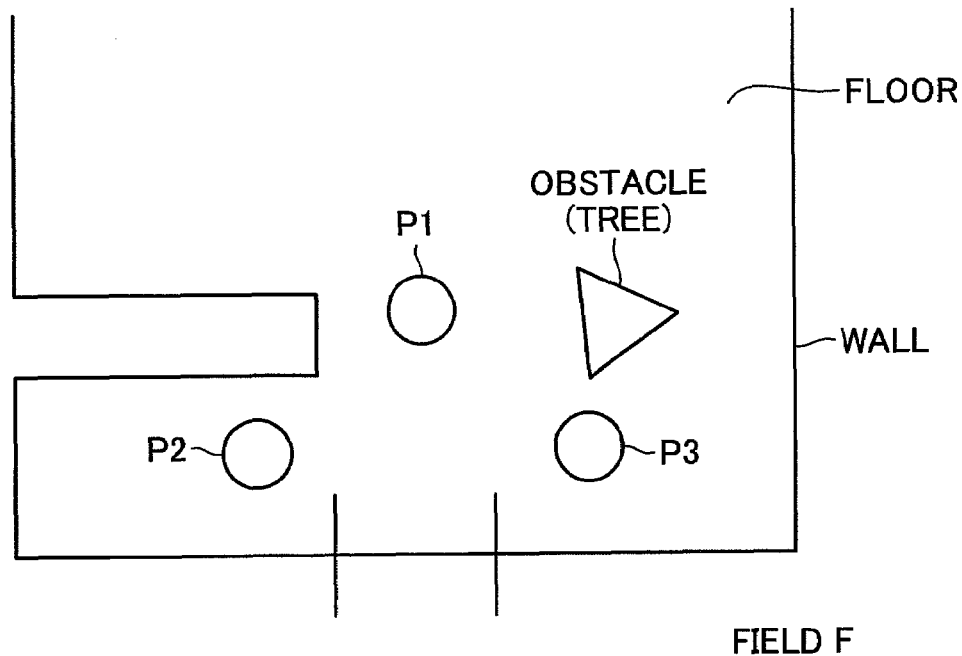
FIG. 8 is an explanatory drawing that shows an example of a field F when viewed from above.

Now, a concrete example will be described when the movement control process for the sub characters P2, P3 is executed. Here, as shown in FIG. 8, the case where two sub characters P2, P3 move so as to follow the movement of a main character P1 in a field F including a floor and a wall in which an obstacle (tree) is provide will be described as an example. In this regard, FIG. 8 is an explanatory drawing that shows an example of the field F when viewed from above.

Figure 9:
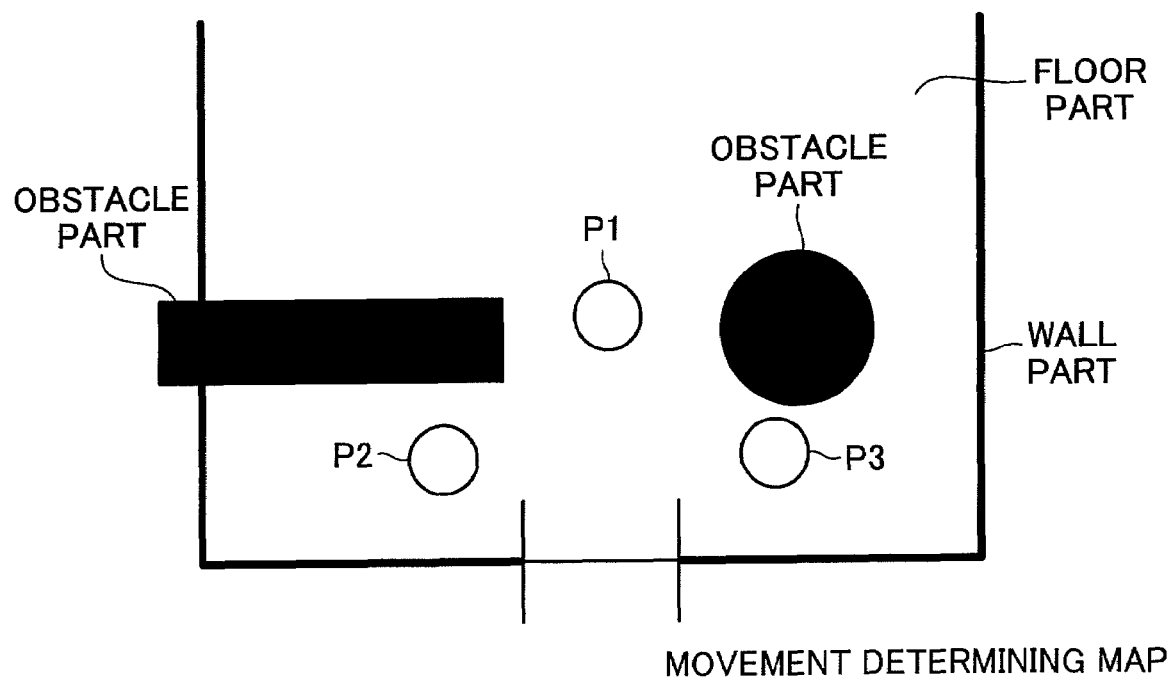
FIG. 9 is an explanatory drawing that shows a movement state of characters that move on the field F of the movement determining map.

FIGS. 9 to 13 are explanatory drawings that show an example of the movement determining map corresponding to the field F shown in FIG. 8, which illustrate a movement state of the main and sub characters P1 to P3 that move on the field F. As shown in FIG. 9, in the movement determining map, a bulge of a wall (or a protrusion from the wall) is set to an obstacle part (wall), and a predetermined circular region including an obstacle (tree) is set to an obstacle part (tree). Here, in order to simplify the explanation, the explanation will proceed with reference to the movement determining map that corresponds to the field F.

Figure 10:
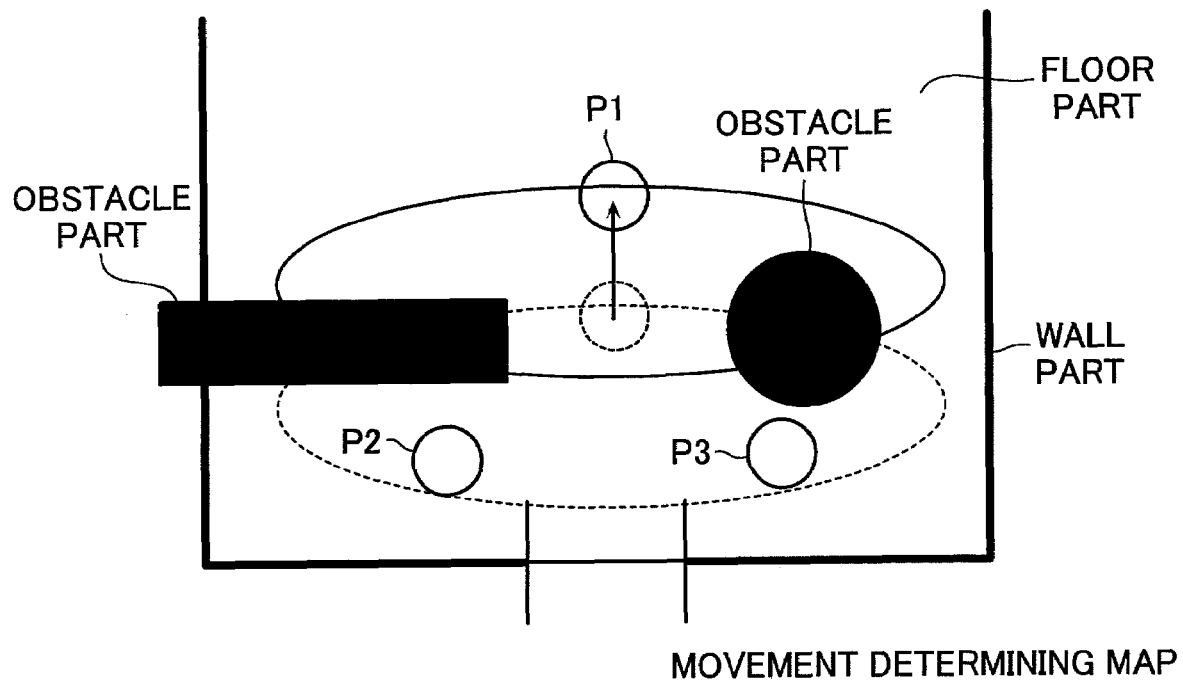
FIG. 10 is an explanatory drawing that shows the movement state of characters that move on the field F of the movement determining map.

First of all, in the case where a predetermined route determining condition is met ("Yes" at Step S201), as shown in FIG. 10, the main character P1 is caused to move forward by a predetermined distance in the field F (that is, upward in FIG. 10). In this case, a standard position of each of the sub characters P2, P3 is changed from a predetermined position in an ellipse indicated by a dotted line in FIG. 10 (that is, a position at which each of the sub characters P2, P3 exists in FIG. 10) to a predetermined position in an ellipse indicated by a solid line in FIG. 10 (that is, a position moved forward from the ellipse indicated by the dotted line by the same predetermined distance as that of the main character P1). Thus, the control section 11 determines that the standard position after change is a destination (Step S203), and derives the shortest movement route to the determined destination (Step S204).

Figure 11:
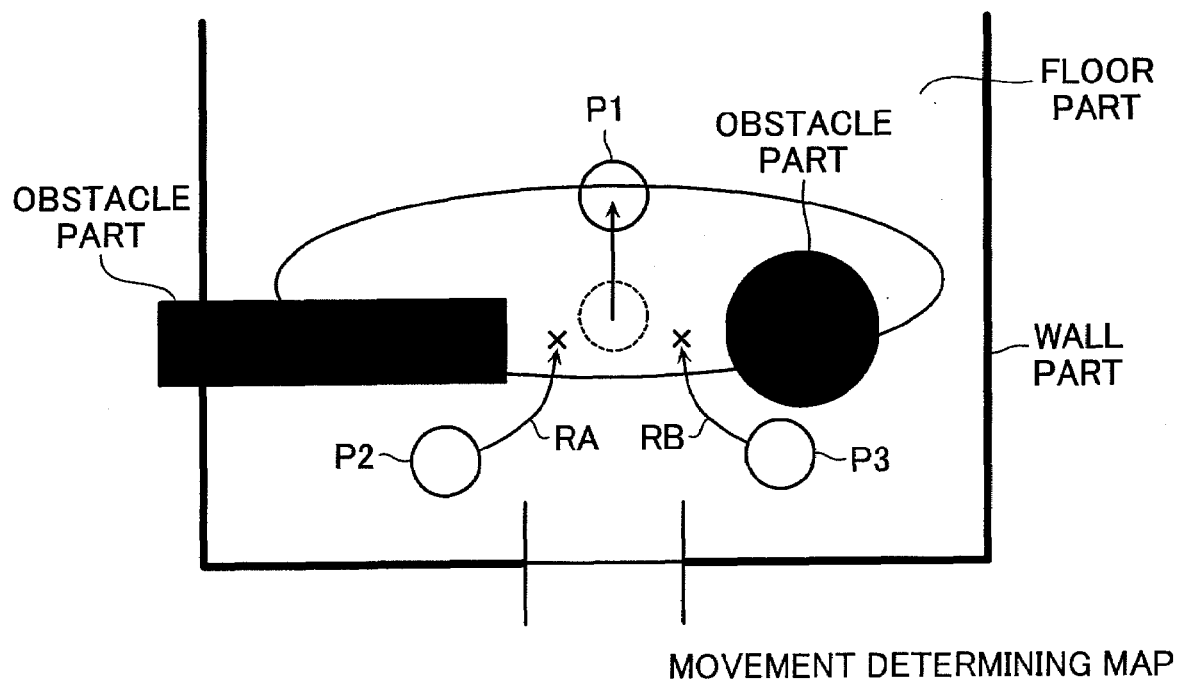
FIG. 11 is an explanatory drawing that shows the movement state of characters that move on the field F of the movement determining map.

However, as shown in FIG. 10, the position that is to be the destination of each of the sub characters P2, P3 and that is moved forward from the previous standard position in the same predetermined distance as that of the main character P1 is an obstacle part. For this reason, the control, section 11 determines that there is an unenterable region in the derived shortest movement route (Step S205), and stores the polygons whose attribute is "unenterable" and the display region of the obstacle, which are positioned on the shortest movement route, in the RAM 12 as the unenterable region (Step S206). Further, since the destination is included in the unenterable region stored at Step S206, the control section 11 changes the destination to the nearest position within the region in a predetermined range based on the position of the main character P1 from which the unenterable region is eliminated (that is, within the elliptical region indicated by the solid line shown in FIG. 10). Here, points indicated by "x" in FIG. 11 are determined as new destinations for the sub characters P2, P3.

The control section 11 then derives the shortest movement route from the current position to the changed destination in the region from which the stored unenterable region is eliminated (Step S207). Here, for example, as shown in FIG. 11, the shortest movement routes RA and RB are derived for the sub characters P2, P3, respectively. The shortest movement routes RA and RB are routes in consideration of the widths of the corresponding sub characters P2, P3, respectively.

Since each of the derived shortest movement routes RA and RB does not include any unenterable region ("No" at Step S205), the control section 11 determines the derived shortest movement routes RA and RB as movement routes for the sub characters P2, P3 (Step S208). The sub characters P2, P3 are then caused to move to the corresponding destinations via the determined shortest movement routes RA and RB, respectively (Step S209). When the sub characters P2, P3 are respectively caused to move to the corresponding destinations via the shortest movement routes RA and RB, the sub characters P2, P3 reach the positions shown in FIG. 12, respectively.

Figure 12:
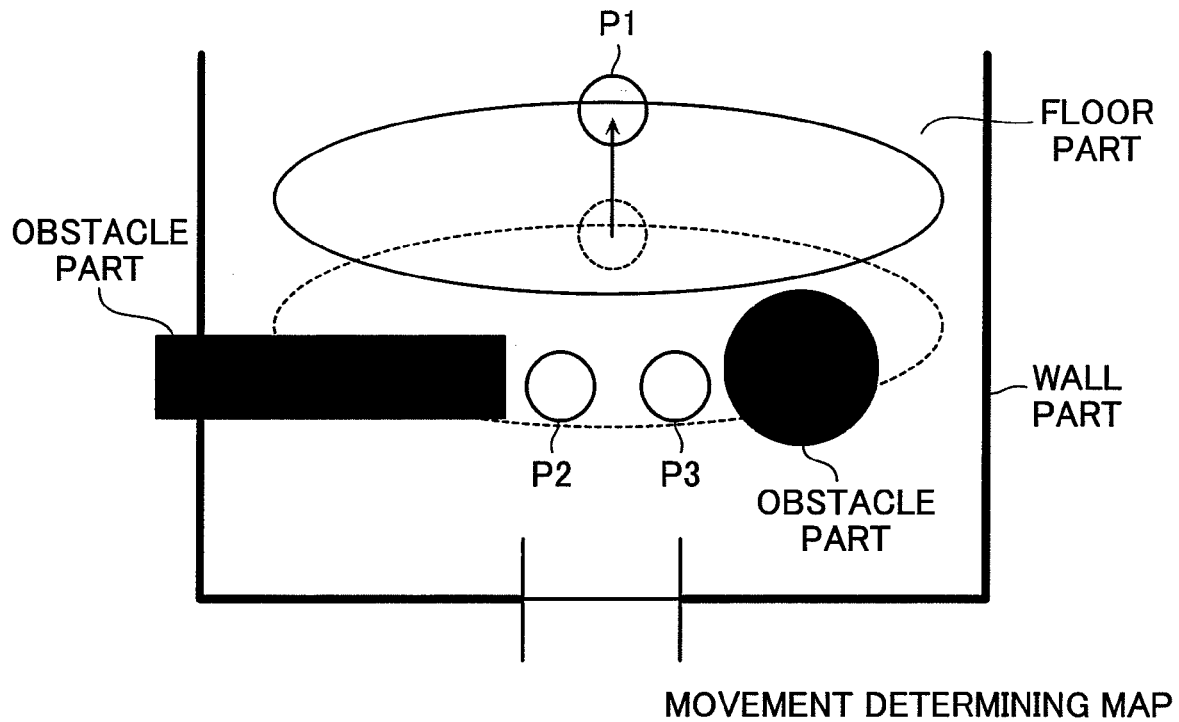
FIG. 12 is an explanatory drawing that shows the movement state of characters that move on the field F of the movement determining map.

When a predetermined route determining condition is then met ("Yes" at Step S201), as shown in FIG. 12, the main character P1 is caused to further move forward by a predetermined distance in the field F (that is, upward in FIG. 12). In this case, a standard position of each of the sub characters P2, P3 is changed from a predetermined position in an ellipse indicated by a dotted line in FIG. 12 (that is, a position that is different from the position at which each of the sub characters P2, P3 exists in FIG. 12, but is moved forward from the position at which each of the sub characters P2, P3 exists in FIG. 11 in the same predetermined distance as the movement distance of the main character P1 shown in FIG. 11) to a predetermined position in an ellipse indicated by a solid line in FIG. 12 (that is, a position that is not the current display position, but moved is forward from the standard position by the same predetermined distance as that of the main character P1; points "x" shown in FIG. 13). Thus, the control section 11 determines that the standard position after change is a destination (Step S203), and derives the shortest movement route to the determined destination (Step S204).

Figure 13:
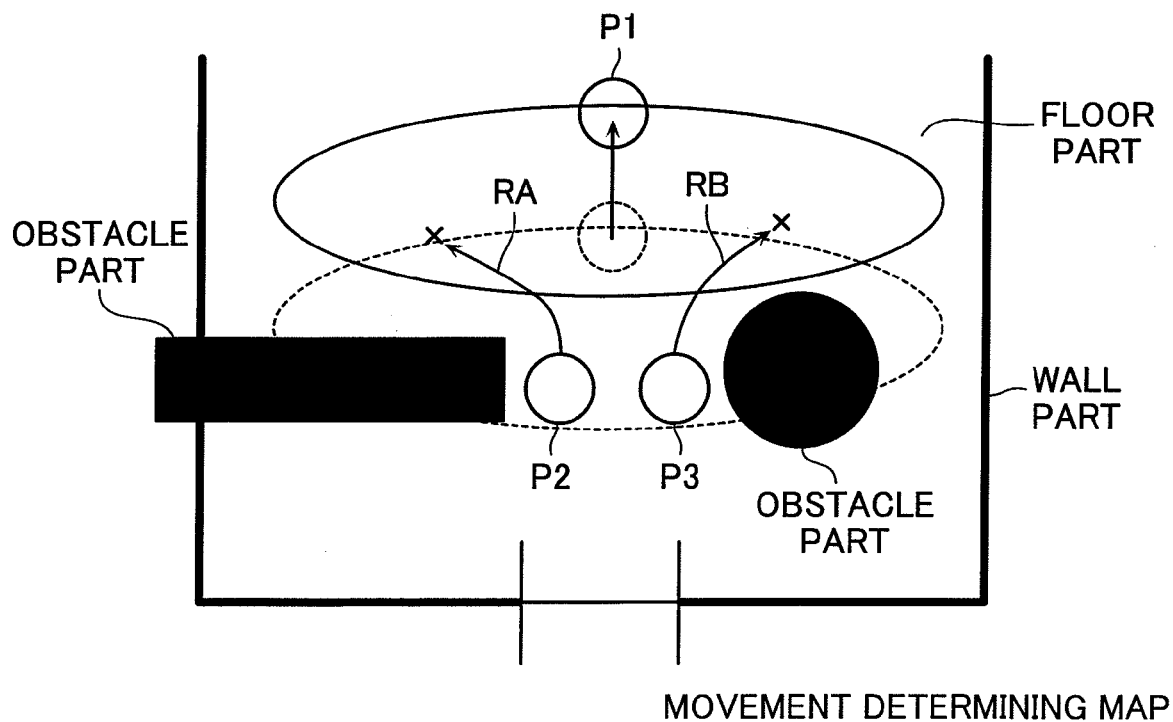
FIG. 13 is an explanatory drawing that shows the movement state of characters that move on the field F of the movement determining map.

However, as shown in FIG. 13, the shortest movement route of each of the sub characters P2, P3 from the current position to the destination includes an unenterable region, that is, an obstacle part in consideration of the width of each of the sub characters P2, P3. For this reason, the control section 11 determines that there is an unenterable region in the derived shortest movement route (Step S205), and stores the polygons whose attribute is "unenterable" and the display region of the obstacle, which are positioned on the shortest movement route, in the RAM 12 as the unenterable region (Step S206).

The control section 11 then derives the shortest movement route from the current position to the destination in the region from which the stored unenterable region is eliminated (Step S207). Here, for example, as shown in FIG. 13, the shortest movement routes RA and RB are derived for the sub characters P2, P3, respectively. The shortest movement routes RA and RB are routes in consideration of the widths of the corresponding sub characters P2, P3, respectively.

Since each of the derived shortest movement routes RA and RB does not include any unenterable region ("No" at Step S205), the control section 11 determines the derived shortest movement routes RA and RB as movement routes for the sub characters P2, P3 (Step S208). The sub characters P2, P3 are then caused to move the corresponding destinations (that is, points "x" shown in FIG. 13) via the determined shortest movement routes RA and RB, respectively (Step S209).

As explained above, in the embodiment described above, the video game apparatus 100 is constructed as follows. Namely, a movement determining map that is a two-dimensional map in which an enterable region and an unenterable region for a character in a field are distinguishably set (for example, the movement determining map shown in FIG. 4 and the like) is prepared in advance in addition to a field display map that is a three-dimensional map for displaying a field of a video game on the image display screen 51 (for example, a three-dimensional map for displaying the field (three-dimensional virtual space) shown in FIG. 3). When a predetermined movement route determining condition (for example, the predetermined movement route condition is met every predetermined period of time, or the predetermined movement route condition is met when the main character is apart from the sub character in a predetermined distance or more) is met, the control section 11 determines a movement route of the sub character on which no unenterable region exists by using the movement determining map. The control section 11 then causes the sub character to move in accordance with the determined movement route. Thus, by means of a simple process in which a processing load is reduced, it is possible to prevent the sub character following the main character from becoming a movement impossible state due to an obstacle or the like.

Namely, by referring to the movement determining map prepared as the two-dimensional map in which the corresponding field is simplified as much as possible when a movement route of the sub character is determined, it is possible to determine whether there is an unenterable region on the movement route or not easily and rapidly. This makes it possible to determine the movement route in which no unenterable region is included rapidly and accurately. Therefore, it is possible to determine the movement route (that is, unenterable region bypass route) in which the sub character is prevented from becoming a movement impossible state due to an obstacle or the like by means of a simple process in which a processing load is reduced. This makes it possible to move the sub character smoothly.

Further, in the embodiment described above, an attribute by which it can be distinguished whether it is an enterable region or an unenterable region is applied to each of a floor, a wall and obstacles other than the floor or wall included in the movement determining map. The distinguishable attribute corresponds to a display region thereof. Thus, it is possible to determine whether a predetermined region on the corresponding field is an enterable region or an unenterable region easily and rapidly.

Moreover, in the embodiment described above, a region of the wall part protruding toward the floor part is set as an obstacle part into the movement determining map as a whole. Thus, it is possible to simplify setting information of the movement determining map. This makes it possible to determine whether a predetermined region on the field is an enterable region or an unenterable region easily and rapidly.

Furthermore, in the embodiment described above, in the case where an obstacle such as a tree or a stone is displayed on the corresponding field, a display region that a character cannot enter is set not only to a display region of the obstacle but also to a predetermined region around the obstacle (for example, a circular region, an elliptic region or the like). Thus, it is possible to prepare the movement determining map even though the obstacle has a complicated shape, and this makes it possible to simplify setting information of the movement determining map. Therefore, it is possible to determine whether a predetermined region on the field is an enterable region or an unenterable region easily and rapidly.

Further, in the embodiment described above, the video game apparatus 100 is constructed so that the control section 11 determines a movement destination of the sub character and then determines the movable route on which the sub character can move at the shortest distance among movement routes on which the sub character can move from the current position to the movement destination without entering any unenterable region. Thus, by means of a simple process using the movement determining map, it is possible to determine the movement route of the sub character on which the sub character can move at the shortest distance without entering any unenterable region.

Moreover, in the embodiment described above, the video game apparatus 100 is constructed as follows. Namely, the control section 11 determines a route from the current position to the movement destination on which the sub character can move at shortest distance, and then determines whether or not any unenterable region is included in the determined route using the movement determining map. In the case where it is determined that an unenterable region is included in the determined route, the unenterable region is stored. The control section 11 then repeatedly executes a process to determine the movement route of the sub character from the current position to the movement destination on which the sub character can move at the shortest distance in the region from which the stored unenterable region is eliminated until it is determined that no unenterable region is included in the determined route. Thus, by means of a simple process using the movement determining map, it is possible to determine the movement route of the sub character on which the sub character can move at the shortest distance without entering any unenterable region.

Furthermore, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Further, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute various processes in the embodiment as described above.

The present invention can be applied to a video game machine, a personal computer, a cellular phone terminal, a portable game apparatus or the like, or any combination thereof that causes an image display apparatus to display multiple characters, including a main character and a sub character, on an image display screen, and controls progress of a video game by controlling an action of the main character to be displayed on the image display screen in accordance with an operation by a player and an action of the sub character moving so as to follow the main character to be displayed on the image display screen in accordance with a predetermined control program. Therefore, the present invention is useful.

What is claimed is:

1. A video game processing apparatus that causes an image display apparatus to display multiple characters, including a main character and a sub character moving in a field that includes an enterable region and an unenterable region provided in a virtual three-dimensional space, on an image display screen of the image display apparatus, the video game processing apparatus controlling progress of the video game by controlling an action such as moving of the main character to be displayed on the image display screen in accordance with operations by a player and an action such as moving of the sub character following the moving of the main character to be displayed on the image display screen in accordance with a predetermined control program, the sub character moving so as to follow the main character, the video game processing apparatus comprising:

a movement determining map generator that generates a movement determining mare based on a field display map, the field display mare being a three-dimensional mare that represents the field provided in the virtual three-dimensional space, the movement determining mare being a two-dimensional representation of the field display mare that identifies the enterable region and the unenterable region of the field;

a movement determining map memory that stores the movement determining map in addition to the field display map;

a movement route determiner that identifies the enterable region and the unenterable region on the field provided in the virtual three-dimensional space by using the movement determining map and that determines a movement route of the sub character in the field using the movement determining map when the main character separates from the sub character by a predetermined distance; and a movement executor that causes the sub character to move in accordance with the movement route determined by the movement route determiner, wherein the determined movement route of the sub character causes the sub character to follow the main character in the enterable region on the field, and wherein the determined movement route of the sub character exists only in the enterable region on the field.

2. The video game processing apparatus according to claim 1, wherein the movement determining map identifies a floor part comprising the enterable region and a wall part comprising the unenterable region.

3. The video game processing apparatus according to claim 2, wherein at least a portion of the floor part further comprises the unenterable region.

4. The video game processing apparatus according to claim 1, wherein an obstacle is provided and displayed in the field, and in the movement determining map, a predetermined circumferential region of the obstacle including a display region in which the obstacle is displayed is set to an obstacle part that is identified as the unenterable region.

5. The video game processing apparatus according to claim 1, wherein the movement route determiner comprises:
a destination determiner that determines a movement destination to which the sub character moves; and
a movement route decider that decides a shortest movable route along which the sub character can move by a shortest distance among movement routes on which the sub character can move from a current position of the sub character to the movement destination determined by the destination determiner without entering the unenterable region.

6. The video game processing apparatus according to claim 5, wherein the movement route decider includes:
a shortest movement route determiner that determines a shortest movement route along which the sub character moves from the current position to the movement destination determined by the destination determiner by the shortest distance;
an unenterable region determiner that determines whether at least a portion of the unenterable region is included along the shortest movement route determined by the shortest movement route determiner;
an unenterable region memory that stores the portion of the unenterable region determined to be included along the shortest movement route by the unenterable region determiner; and
an unenterable region bypass route determiner that determines an unenterable region bypass route along which the sub character moves from the current position to the movement destination determined by the destination determiner by the shortest distance when the portion of the unenterable region is stored in the unenterable region memory, the unenterable region bypass route being determined within a region from which the portion of the unenterable region stored in the unenterable region memory is eliminated,
wherein the unenterable region determiner also determines whether a new portion of the unenterable region is included along the unenterable region bypass route determined by the unenterable region bypass route determiner, and
wherein the movement route decider decides one of the shortest movement route and the unenterable region bypass route, in which one of the unenterable region determiner and the unenterable region bypass route determiner determines that no unenterable region is included, as the shortest movable route that is the movement route of the sub character.

7. A computer implemented method of processing a video game by causing an image display apparatus to display multiple characters, including a main character and a sub character moving in a field that includes an enterable region and an unenterable region provided in a virtual three-dimensional space, on an image display screen of the image display apparatus, the method controlling progress of the video game by controlling an action such as moving of the main character to be displayed on the image display screen in accordance with operations by a player and an action such as moving of the sub character in the field to be displayed on the image display screen in accordance with a predetermined control program, the sub character moving so as to follow the main character, the computer implemented method comprising:
generating, using a computer, a movement determining map based on a field display map, the field display map being a three-dimensional map that represents the field provided in the virtual three-dimensional space, the movement determining map being a two-dimensional representation of the field display map that identifies the enterable region and the unenterable region of the field;
storing, in a memory of the computer, the movement determining mare and the field display map;
identifying, using the computer, the enterable region and the unenterable region on the field provided in the virtual three-dimensional space by using the movement determining map and determining a movement route of the sub character in the field using the movement determining map when the main character separates from the sub character by a predetermined distance; and
causing, using the computer, the sub character to move in accordance with the determined movement route,
wherein the determined movement route of the sub character causes the sub character to follow the main character in the enterable region on the field, and
wherein the determined movement route of the sub character exists only in the enterable region on the field.

8. The method according to claim 7, wherein the movement determining map identifies a floor part comprising the enterable region and a wall part comprising the unenterable region.

9. The method according to claim 8, wherein at least a portion of the floor part further comprises the unenterable region.

10. The method according to claim 7, wherein an obstacle is provided and displayed in the field, and in the movement determining map, a predetermined circumferential region of the obstacle including a display region in which the obstacle is displayed is set to an obstacle part that is identified as the unenterable region.

11. The method according to claim 7, wherein the determining a movement route of the sub character includes:
determining, using the computer, a movement destination to which the sub character moves; and
deciding, using the computer, a shortest movable route along which the sub character can move by a shortest distance among movement routes on which the sub character can move from a current position of the sub character to the determined movement destination without entering the unenterable region.

12. The method according to claim 11, wherein the deciding the shortest movable route includes:
   determining, using the computer, a shortest movement route along which the sub character moves from the current position to the determined movement destination by the shortest distance;
   determining, using the computer, whether at least a portion of the unenterable region is included along the determined shortest movement route;
   storing, using the computer, the portion of the unenterable region determined to be included along the shortest movement route in an unenterable region memory; and
   determining, using the computer, an unenterable region bypass route along which the sub character moves from the current position to the determined movement destination by the shortest distance when the portion of the unenterable region is stored in the unenterable region memory, the unenterable region bypass route being determined within a region from which the portion of the unenterable region stored in the unenterable region memory is eliminated,
   wherein it is also determined whether a new portion of the unenterable region is included along the determined unenterable region bypass route, and
   wherein one of the shortest movement route and the unenterable region bypass route is decided, in which it is determined that no unenterable region is included, as the shortest movable route that is the movement route of the sub character.

13. A computer readable medium that stores a program for processing a video game, progress of the video game being controlled by causing an image display apparatus to display multiple characters, including a main character and a sub character moving in a field that includes an enterable region and an unenterable region provided in a virtual three-dimensional space, on an image display screen of the image display apparatus, and controlling an action such as moving of the main character to be displayed on the image display screen in accordance with operations by a player and an action such as moving of the sub character following the moving of the main character to be displayed on the image display screen, the sub character moving so as to follow the main character, the program on the computer readable medium causing a computer to execute:
   generating a movement determining map based on a field display map, the field display map being a three-dimensional map that represents the field provided in the virtual three-dimensional space, the movement determining map being a two-dimensional representation of the field display map that identifies the enterable region and the unenterable region of the field;
   storing the movement determining map and the field display map;
   identifying the enterable region and the unenterable region on the field provided in the virtual three-dimensional space by using the movement determining map and determining a movement route of the sub character in the field using the movement determining map when the main character separates from the sub character by a predetermined distance; and
   causing the sub character to move in accordance with the determined movement route,
   wherein the determined movement route of the sub character causes the sub character to follow the main character in the enterable region on the field, and
   wherein the determined movement route of the sub character exists only in the enterable region on the field.

14. The computer readable medium according to claim 13, wherein the movement determining map identifies a floor part comprising the enterable region and a wall part comprising the unenterable region.

15. The computer readable medium according to claim 14, wherein at least a portion of the floor part further comprises the unenterable region.

16. The computer readable medium according to claim 13, wherein an obstacle is provided and displayed in the field, and in the movement determining map, a predetermined circumferential region of the obstacle including a display region in which the obstacle is displayed is set to an obstacle part that is identified as the unenterable region.

17. The computer readable medium according to claim 13, wherein in determining a movement route of the sub character, the computer readable medium causing the computer to execute:
   determining a movement destination to which the sub character moves; and
   deciding the shortest movable route along which the sub character can move by a shortest distance among movement routes by which the sub character can move from a current position of the sub character to the determined movement destination without entering the unenterable region.

18. The computer readable medium according to claim 17, wherein in the deciding the shortest movable route, the computer readable medium causes the computer to execute:
   determining a shortest movement route along which the sub character moves from the current position to the determined movement destination by the shortest distance;
   determining whether at least a portion of the unenterable region is included along the determined shortest movement route;
   storing the portion of the unenterable region determined to be included on the shortest movement route in an unenterable region memory; and
   determining an unenterable region bypass route on which the sub character moves from the current position to the determined movement destination by the shortest distance when the portion of the unenterable region is stored in the unenterable region memory, the unenterable region bypass route being determined within a region from which the portion of the unenterable region stored in the unenterable region memory is eliminated,
   wherein it is also determined whether a new portion of the unenterable region is included along the determined unenterable region bypass route, and
   wherein one of the shortest movement route and the unenterable region bypass route is decided, in which it is determined that no unenterable region is included, as the shortest movable route that is the movement route of the sub character.

* * * * *

UNITED STATES PATENT AND TRADEMARK OFFICE
CERTIFICATE OF CORRECTION

PATENT NO.         : 7,677,977 B2                                              Page 1 of 1
APPLICATION NO.    : 11/680205
DATED              : March 16, 2010
INVENTOR(S)        : K. Maehiro et al.

It is certified that error appears in the above-identified patent and that said Letters Patent is hereby corrected as shown below:

At column 18, line 58 (claim 1, line 17) of the printed patent, "mare" should be --map--.

At column 18, line 59 (claim 1, line 18) of the printed patent, "mare" should be --map--.

At column 18, line 60 (claim 1, line 19) of the printed patent, "mare" should be --map--.

At column 18, line 62 (claim 1, line 21) of the printed patent, "mare" should be --map--.

At column 18, line 63 (claim 1, line 22) of the printed patent, "mare" should be --map--.

Signed and Sealed this

Seventh Day of September, 2010

David J. Kappos
*Director of the United States Patent and Trademark Office*